United States Patent
Koupy et al.

(10) Patent No.: US 10,846,069 B2
(45) Date of Patent: Nov. 24, 2020

(54) METHOD OF DISTRIBUTED GRAPH LOADING FOR MINIMAL COMMUNICATION AND GOOD BALANCE VIA LAZY MATERIALIZATION AND DIRECTORY INDIRECTION USING INDEXED TABULAR REPRESENTATION

(71) Applicant: Oracle International Corporation, Redwood Shores, CA (US)

(72) Inventors: Petr Koupy, Blansko (CZ); Thomas Manhardt, Foster City, CA (US); Siegfried Depner, Sunnyvale, CA (US); Sungpack Hong, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 393 days.

(21) Appl. No.: 15/721,848

(22) Filed: Sep. 30, 2017

(65) Prior Publication Data

US 2019/0102154 A1 Apr. 4, 2019

(51) Int. Cl.
*G06F 16/00* (2019.01)
*G06F 8/41* (2018.01)
(Continued)

(52) U.S. Cl.
CPC ............ *G06F 8/453* (2013.01); *G06F 9/5038* (2013.01); *G06F 11/3433* (2013.01);
(Continued)

(58) Field of Classification Search
CPC .................................................. G06F 16/278
(Continued)

(56) References Cited

U.S. PATENT DOCUMENTS 8,321,492 B1   11/2012 Sengupta et al.
8,631,094 B1   1/2014 Alpart
(Continued)

FOREIGN PATENT DOCUMENTS

WO   WO2015099562 A1   7/2015

OTHER PUBLICATIONS

Nelson et al., "Latency-Tolerant Software Distributed Shared Memory", dated Jul. 10, 2015, 15 pages.
(Continued)

*Primary Examiner* — Chelcie L Daye
(74) *Attorney, Agent, or Firm* — Hickman Palermo Becker Bingham LLP

(57) ABSTRACT

Techniques herein minimally communicate between computers to repartition a graph. In embodiments, each computer receives a partition of edges and vertices of the graph. For each of its edges or vertices, each computer stores an intermediate representation into an edge table (ET) or vertex table. Different edges of a vertex may be loaded by different computers, which may cause a conflict. Each computer announces that a vertex resides on the computer to a respective tracking computer. Each tracking computer makes assignments of vertices to computers and publicizes those assignments. Each computer that loaded conflicted vertices transfers those vertices to computers of the respective assignments. Each computer stores a materialized representation of a partition based on: the ET and vertex table of the computer, and the vertices and edges that were transferred to the computer. Edges stored in the materialized representation are stored differently than edges stored in the ET.

24 Claims, 11 Drawing Sheets

(51) Int. Cl.

| | | |
|---|---|---|
| *G06F 9/50* | (2006.01) | |
| *G06F 17/16* | (2006.01) | |
| *G06F 16/27* | (2019.01) | |
| *G06F 17/10* | (2006.01) | |
| *G06F 11/34* | (2006.01) | |
| *G06F 3/06* | (2006.01) | |
| *G06F 11/10* | (2006.01) | |
| *G06F 16/901* | (2019.01) | |

(52) U.S. Cl.
CPC ............ *G06F 16/278* (2019.01); *G06F 17/10* (2013.01); *G06F 17/16* (2013.01); *G06F 3/061* (2013.01); *G06F 11/1076* (2013.01); *G06F 16/9024* (2019.01)

(58) Field of Classification Search
USPC ........................................................ 707/798
See application file for complete search history.

(56) References Cited

U.S. PATENT DOCUMENTS

| | | |
|---|---|---|
| 9,477,532 B1 | 10/2016 | Hong |
| 9,535,756 B2 | 1/2017 | Depner et al. |
| 9,740,536 B2 | 8/2017 | Van der Lug et al. |
| 10,002,205 B2 | 6/2018 | Roth et al. |
| 2005/0256893 A1 | 11/2005 | Perry |
| 2008/0098375 A1 | 4/2008 | Isard |
| 2009/0097418 A1 | 4/2009 | Castillo |
| 2012/0158858 A1 | 6/2012 | Gkantsidis |
| 2012/0303685 A1 | 11/2012 | Ulrich |
| 2016/0063037 A1 | 3/2016 | Savkli |
| 2017/0068746 A1* | 3/2017 | Levin .................... G06F 16/278 |
| 2017/0127466 A1 | 5/2017 | Narasimha |
| 2017/0147706 A1 | 5/2017 | Roth et al. |
| 2018/0039709 A1 | 2/2018 | Chen |
| 2018/0039710 A1* | 2/2018 | Chen .................. G06F 16/9024 |

OTHER PUBLICATIONS

Depner, U.S. Appl. No. 15/607,985, filed May 30, 2017, Office Action, dated May 16, 2019.

Tian et al., From "Think Like a Vertex" to "Think Like a Graph", 40th International Conference on Very Large Data Bases, dated Sep. 2014, Proceedings of the VLDB Endowment, vol. 7, No. 3, 12 pgs.

Then et al., "Evaluation of Parallel Graph Loading Techniques", ACM, GRADES 2016, Jun. 24, 2016, Redwood Shores, 6 pages.

Roth et al., "PGX.D/Async: A Scalable Distributed Graph Pattern Matching Engine", ACM, dated May 19, 2017, 6 pages.

Presta et al., "Large-scale Graph Partitioning with Apache Giraph", Engineering Blog, Facebook Code, dated Apr. 9, 2014, 8 pages.

Low et al., "Distributed GraphLab: A Framework for Machine Learning and Data Mining in the Cloud", Proceedings of the VLDB Endowment, vol. 5, No. 8, dated Aug. 27, 2012, 12 pages.

Low et al., "Distributed GraphLab: A Framework for Machine Learning and Data Mining in the Cloud", Proceedings of the VLDB Endowment, vol. 5, No. 8, dated 2012, 12 pages.

Karypis, George,METIS, A Software Package for Partitioning Unstructured Graphs, Partitioning Meshes, and Computing Fill-Reducing Orderings of Sparse Matrices Version 5.1.0, dated Mar. 30, 2013, 3pgs.

Gonzalez, "GraphX: Graph Processing in a Distributed Dataflow Framework", Proceedings of the 11th USENIX Symposium on Operating Systems Design and Implementation, dated Oct. 2014, 16 pages.

Gonzalez et al., "PowerGraph: Distributed Graph-Parallel Computation on Natural Graphs", 10th USENIX Symposium on Operating Systems Design and Implementation, dated 2012, 14 pages.

Gonzalez et al., "GraphX Processing in a Distributed Dataflow Framework", https://amplab.cs.berkeley.edu/wp-content/uploads/2014/09/graphx.pdf, dated 2014, 15 pages.

Depner, U.S. Appl. No. 15/607,985, filed May 30, 2017, Notice of Allowance, dated Sep. 20, 2019.

Roth, U.S. Appl. No. 14/947,382, filed Nov. 20, 2015, Notice of Allowance, dated Feb. 9, 2018.

U.S. Appl. No. 14/876,075, filed Oct. 6, 2015, Notice of Allowance, dated Jun. 22, 2016.

Mathew et al., "An Efficient Index based Query handling model for Neo4j", International Journal of Advances in Computer Science and Technology (IJACST), vol. 3 No. 2, dated 2014, 7 pages.

Dave et al., "GraphFrames: An Integrated API for Mixing Graph and Relational Queries", ACM, dated 2016, 8 pages.

* cited by examiner

METHOD OF DISTRIBUTED GRAPH LOADING FOR MINIMAL COMMUNICATION AND GOOD BALANCE VIA LAZY MATERIALIZATION AND DIRECTORY INDIRECTION USING INDEXED TABULAR REPRESENTATION

FIELD OF THE DISCLOSURE

This disclosure relates to graph data partitioning for a distributed system. Presented herein are coordination techniques that need less communication and processing to achieve well balanced repartitioning.

BACKGROUND

Graph processing is an analytic technique of increasing importance for Big Data. Accommodating a huge dataset may involve horizontal scaling. Thus, distributed graph processing may be required and involve multiple computers connected by network.

Although there are various distributed graph processing tools available, graph loading remains problematic. It takes too long to load graph data into the distributed graph processing system itself, before applying any analysis at all.

The overhead of distributed graph loading typically arises from the process and consequences of assigning and retrieving data partitions. Partitioned loading entails multiple computers simultaneously retrieving data in non-overlapping and/or contentious ways. Data needs to be distributed evenly amongst computers. For instance, each computer should have approximately a same number of edges.

Depending on the architecture of distributed graph processing system, there can be additional constraints. For example, directed edges originating from a same vertex should be loaded into a same computer.

Distributed loading of a large graph typically requires multiple phases with complex computation and much network communication. Conventional distributed loading solutions entail assumptions and heuristics that reduce efficiency. For example, eager materialization of the initially loaded graph increases the computational cost of balancing (repartitioning). A straightforward way to partition a graph is to compute hash values of vertex keys and allocate vertices to computers based on those hash values. However, this approach requires much communication during loading and may still result in data imbalance when vertex degree (edge count) distribution is skewed by the graph content.

DETAILED DESCRIPTION

Figure 1:
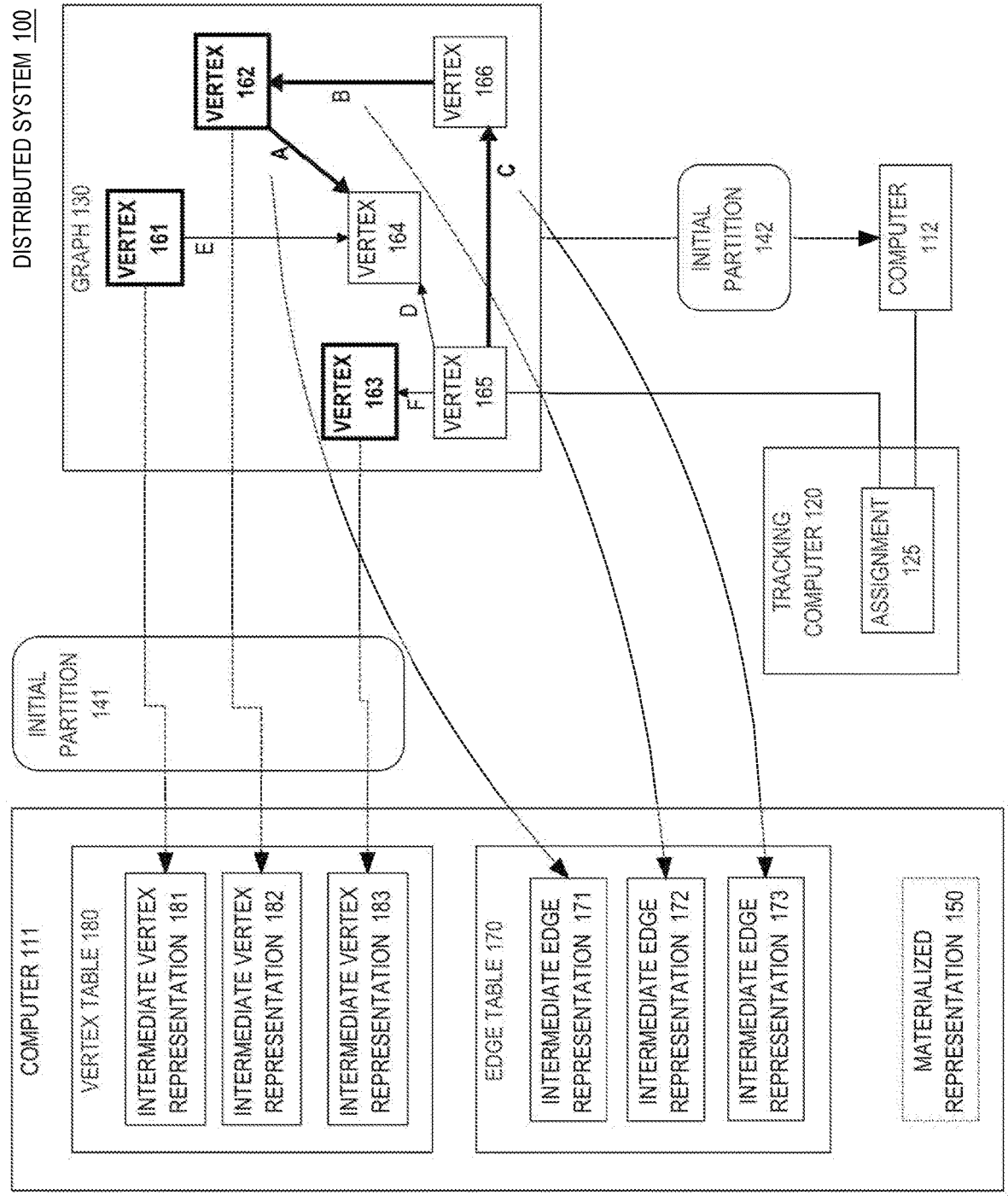
FIG. 1 is a block diagram that depicts an example distributed system that uses minimal communication to repartition a distributed graph to achieve a balanced workload, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Distributed System
   2.1 Physical Topology
   2.2 Initial Partition
   2.3 Graph Retrieval
   2.4 Vertex Table and Edge Table
   2.5 Tracking Computer
   2.6 Vertex Reassignment
   2.7 Virtual Movement
   2.8 Actual Movement
3.0 Example Repartitioning Process
4.0 Intermediate Representation
   4.1 Segmented Array
5.0 Segments
   5.1 Random Access
   5.2 Optimal Merge
6.0 Table Optimizations
   6.1 Indexing
   6.2 Multithreading
   6.3 Table View
7.0 Logical Topology
8.0 Deconfliction
9.0 Ghost Vertex
10.0 Rebalancing
11.0 Hardware Overview
12.0 Software Overview
13.0 Cloud Computing

1.0 General Overview

Techniques are provided for minimal communication between a set of computers to repartition a distributed graph to achieve a balanced workload. In an embodiment, each computer receives a respective initial partition that contains a respective subset of edges of a graph and a respective subset of vertices the graph. For each edge of its respective subset of edges, each computer stores an intermediate representation of the edge into an edge table that resides on the computer. For each vertex of its respective subset of vertices, each computer stores an intermediate representation of the vertex into a vertex table that resides on the computer. The intermediate representation is optimized for mutability, which allows vertices and edges to be readily reallocated to other computers for load balancing.

Different edges of a same vertex may be initially loaded by different computers. Thus, a vertex may be redundantly loaded on multiple computers, which may cause a potential conflict. To facilitate deconfliction, the computer announces that the vertex resides on the computer to a respective tracking computer of the set of computers. Each tracking computer makes assignments of particular vertices to particular computers and makes those assignments available to the set of computers. Each computer of the set of computers that initially loaded some of the particular vertices transfers the particular vertices and edges that originate at the particular vertices to the particular computers of the respective assignments. Each computer of the set of computers stores a materialized representation of a respective balanced partition based on: the edge table that resides on the computer, the vertex table that resides on the computer, and the vertices and the edges that were transferred to the computer. Edges stored in the materialized representation of the respective balanced partition are stored in a different format than edges stored in the edge table that resides on the computer.

In embodiments, a segmented array is used to implement each column of an edge table or vertex table. A segmented array provides mutability and random access with desirable asymptotic computational complexity. A technique for merging segmented arrays is presented herein.

In embodiments, a table view is superimposed upon an edge table or vertex table to achieve thread safety and information hiding. In embodiments, batching and iteration are used for deconfliction of redundantly loaded vertices. In embodiments, ghost vertices are synthesized to avoid conflicts. In embodiments, coordination of the topology of computers is enhanced with a master computer that can orchestrate rebalancing of partitions.

2.0 Example Distributed System

FIG. 1 is a block diagram that depicts an example distributed system 100, in an embodiment. Distributed system 100 uses minimal communication to repartition a distributed graph to achieve a balanced workload.

2.1 Physical Topology

Distributed system 100 contains networked computers such as 111-112 and 120, which may be personal computers, rack servers such as blades, mainframes, virtual machines, or other connected computing devices capable of graph processing. Computers 111-112 and 120 intercommunicate over connections that span one or more networks such as a local area network (LAN), backplane, or internetwork.

2.2 Initial Partition

To process distributed graph 130 in parallel, computers 111-112 respectively load initial partitions 141-142 of graph 130 from a file, database, or other shared data store. Graph 130 is a directed graph that has vertices 161-166 interconnected by directed edges A-F.

Initial partitions 141-142 may contain more or less equal amounts of vertices of graph 130. For example, initial partitions 141-142 may contain a same amount of vertices or edges or vertices and edges loaded from a same amount of bytes, text, or lines of text.

As shown, initial partition 141 contains vertices 161-163. Initial partition 142 contains a same amount of vertices, 164-165.

Just because initial partitions 141-142 contain a same amount of vertices does not mean that computers 111-112 have balanced workloads. For example, initial partitions 141-142 may have unbalanced amounts of edges.

2.3 Graph Retrieval

Which edges A-F occur in which initial partitions 141-142 depends on the embodiments. For example, Oracle PGX supports a variety of graph source file formats such as adjacency list, edge list, two tables text, and flat file that may serialize vertices and edges of a same graph in different orders.

For example, graph 130 may be originally encoded in two table text format. For example, one text file may encode vertices 161-166 each having color and month properties with the following six lines of text.

Line 1: 161 blue April
Line 2: 162 red February
Line 3: 163 blue June
Line 4: 164 green April
Line 5: 165 red June
Line 6: 166 yellow May Likewise, another text file may encode edges A-F each having a weight property with the following six lines of text. For example, Line 1 encodes edge A as originating from vertex 162, terminating at vertex 164, and having a weight of 1.5.

Line 1: 162 164 1.5
Line 2: 166 162 1.1
Line 3: 165 166 3.0
Line 4: 165 164 0.4
Line 5: 161 164 0.4
Line 6: 165 163 1.1

Initial partition 141 may be populated from lines 1-3 of the vertex text file and lines 1-3 of the edges text file. Thus, initial partition 141 may contain vertices 161-163 and edges A-C. Likewise, initial partition 112 may contain vertices 164-166 and edges D-F.

Thus with the two tables text format, initial partitions 111-112 may contain an equal amount of vertices and may contain another (possibly different) equal amount of edges. However, initial partitions 141-142 have poor topological locality of data.

Thus, computers 111-112 may have unbalanced communication and/or processing loads. For example, initial partition 141 contains edge C that connects vertices 165-166 that reside in a different initial partition 142.

Other graph source formats may cause unbalanced partitioning/loading in different ways. For example if a directed edge is initially loaded with the vertex from which the edge originates, then initial partition 141 may contain vertices 161-163 but contain only edges A and E, which are the only two edges that originate from vertices 161-163.

For example, graph 130 may be originally encoded in adjacency list text format. For example, a sole text file may encode vertices 161-166 and edges A-F with the following six lines of text (one line per vertex).

Line 1: 161 blue April 164 0.4
Line 2: 162 red February 164 1.5
Line 3: 163 blue June
Line 4: 164 green April
Line 5: 165 red June 166 3.0 164 0.4 163 1.1
Line 6: 166 yellow May 162 1.1

Thus with the above adjacency list, initial partition 141 contains only edges A-B, shown in bold in text lines 1-2. Whereas, initial partition 142 may have twice as many edges (C-F), shown in bold in text lines 4-6, despite having a same amount of vertices.

2.4 Vertex Table and Edge Table

Regardless of which graph source format, computer 111 loads initial partition 141 into local volatile or non-volatile storage. Computer 111 may load initial partition 141 into data structures such as tables 170 and 180.

Computer 111 encodes vertices 161-162 as respective intermediate vertex representations 181-183 in vertex table 180. Likewise, computer 111 encodes edges A-B as respective intermediate edge representations 171-172 in edge table 170. Likewise, computer 112 loads initial partition 142.

2.5 Tracking Computer

Each of vertices 161-166 is associated with a tracking computer, such as 120, that records which computer owns (e.g. loaded) which vertices. Although not shown, tracking computer 120 may load a respective initial partition. Likewise, computers 111-112 may also operate as tracking computers.

In embodiments, each of computers 111-112 and 120 loads a partition and tracks vertices. Which vertices are tracked by tracking computer 120 may depend on the implementation.

Regardless of the embodiment, all vertices are tracked by exactly one computer. Furthermore, each vertex is tracked by a same computer for the duration of the balancing process described herein.

Computers 111-112 detect which computers track which vertices of respective initial partition 141-142. Computers 111-112 announce to tracking computer 120 which vertices (and how many edges of those vertices) have computers 111-112 loaded.

For example computer 112 may send a network message, such as a hypertext transfer protocol (HTTP) request, that announces to tracking computer 120 that computer 112 loaded vertex 165 and two (D and F) of the edges of vertex 165. Likewise, computer 112 may announce to a different tracking computer that computer 112 loaded vertex 166 without any vertices, even though vertex 166 actually has two edges (that are loaded by computer 111). Likewise, computer 111 may announce to tracking computer 120 that computer 111 loaded edge C that originates from vertex 165, even though vertex 165 is loaded and announced by computer 112.

2.6 Vertex Reassignment

In operation, tracking computers record assignments that indicate which computers own which vertices. For example, tracking computer 120 contains assignment 125 that indicates that vertex 165 is owned by computer 112.

Assignments may initially reflect which computer initially loaded which vertex. However, a conflict arises when multiple computers report a same vertex (to a same tracking computer).

For example, edges C-D and F of vertex 165 are loaded by different computers. Computer 111 loads edges D and F. Whereas, computer 112 loads edge C.

Thus, computers 111-112 both announce vertex 165 to tracking computer 120. However, the announcement by computer 112 may indicate that computer 112 actually loaded the properties of vertex 165. Whereas, computer 111 merely incidentally loaded vertex 165, without properties, as an endpoint of an edge that computer 111 actually loaded.

For example, vertex 165 may have properties for product type, product number, quantity, order date, delivery date, delivery address that are loaded by computer 112 and not computer 111. Only the vertex table of computer 112 may contain a row for the intermediate representation of vertex 165.

Assignments are mutable, and tracking computers may update the assignments that they maintain. For example, tracking computer 120 may direct computers 111-112 to reassign ownership of vertices (and their edges) to other computers. Computers 111-112 process such reassignment directions by annotating intermediate representations 171-172 and 181-183 to record which vertices and edges should eventually be moved to which other computers.

Each row of tables 170 and 180 may record a respective edge or vertex. Tables 170 and 180 are mutable and may dynamically store additional rows.

For example, tracking computer 120 may inform computers 111-112 that vertex 164 is reassigned from computer 112 to computer 111. Thus, computer 112 may mark its intermediate vertex representation (not shown) of vertex 164 to indicate that vertex 164 is now owned by computer 111.

However to accomplish that reassignment of vertex 164, computers 111-112 need not communicate with each other, because tracking computer 120 mediates the reassignment. Furthermore, computer 112 may have initially loaded many properties (not shown) for vertex 164.

Thus, computer 112 may have an intermediate vertex representation of vertex 164 that has many properties and indicates that vertex 164 is reassigned to computer 111.

Thus, reassignment of a vertex (along with its edges that originate from a source computer) may occur at any time as directed by a tracking computer from the source computer to a target computer merely by annotating the vertex and its edges as moved in the vertex table and edge table of the source computer without transferring properties of the vertex and edges. Thus, reassignment of vertices and edges is inexpensive in terms of processing and communicating.

To reassign a vertex, only the vertex's identifier need be sent. An identifier may be a primitive integer such as a serial number, text line number, or database table row number. To virtually move an edge, only the identifiers of the originating vertex and terminating vertex need be sent.

Thus, vertices and edges may be batched at very high density for reassignment. Thus, large amounts of vertices and edges may be reassigned.

Likewise, a same vertex and edges may be repeatedly virtually moved without significant cost. Thus, repeated movement and batching naturally support virtual movement of vertices and edges in iterations and in phases having iterations.

As explained later herein, computers 111-112 may have limited intercommunication with tracking computers during the iterations so that distributed system 100 may eventually converge on a near optimal assignment of vertices to computers. Optimal assignment maximizes edge locality such that a vertex and edges it originates are assigned to a same computer.

2.7 Virtual Movement

Virtual movement is even cheaper than reassignment. Virtual movement entails a tracking computer updating its tracking data to indicate that a vertex has moved from one computer to another, without immediately notifying the computers about the movement. Virtual movement may occur over multiple iterations, and a same vertex can be repeatedly virtually moved without any network communication until a next iteration or after all iterations.

2.8 Actual Movement

Eventually the tracking computers or a master computer (not shown) of distributed system 100 detects convergence or a maximum iterations and may broadcast to computers 111-112 that reassignments now need execution. Responsively, computers 111-112 may send the property values of vertices (and edges) that computers 111-112 initially loaded to whichever computers those vertices and edges are now assigned. For example, computer 111 may send to computer 112 some or all of the data of a row of table 170 or 180 to accomplish a transfer of ownership of an edge or vertex.

Thus, reassignments may describe a balanced data distribution, and subsequent transfer of properties or whole table rows may finally achieve the described balance. Henceforth, computers 111-112 may analyze or otherwise process graph 130 in a distributed and balanced way.

However, tables 170 and 180 are designed for mutation. Whereas, graph analytics may treat graph 130 as more or less immutable.

Thus prior to actual analysis and for efficiency, computers 111-112 should recast their loaded graph data into other data structures that are optimized for read-only use, such as materialized representation 150. For example, computer 111 uses the contents of tables 170 and 180 to populate materialized representation 150. Implementations of mutable and immutable data structures are discussed later herein.

3.0 Example Repartitioning Process

Figure 2:
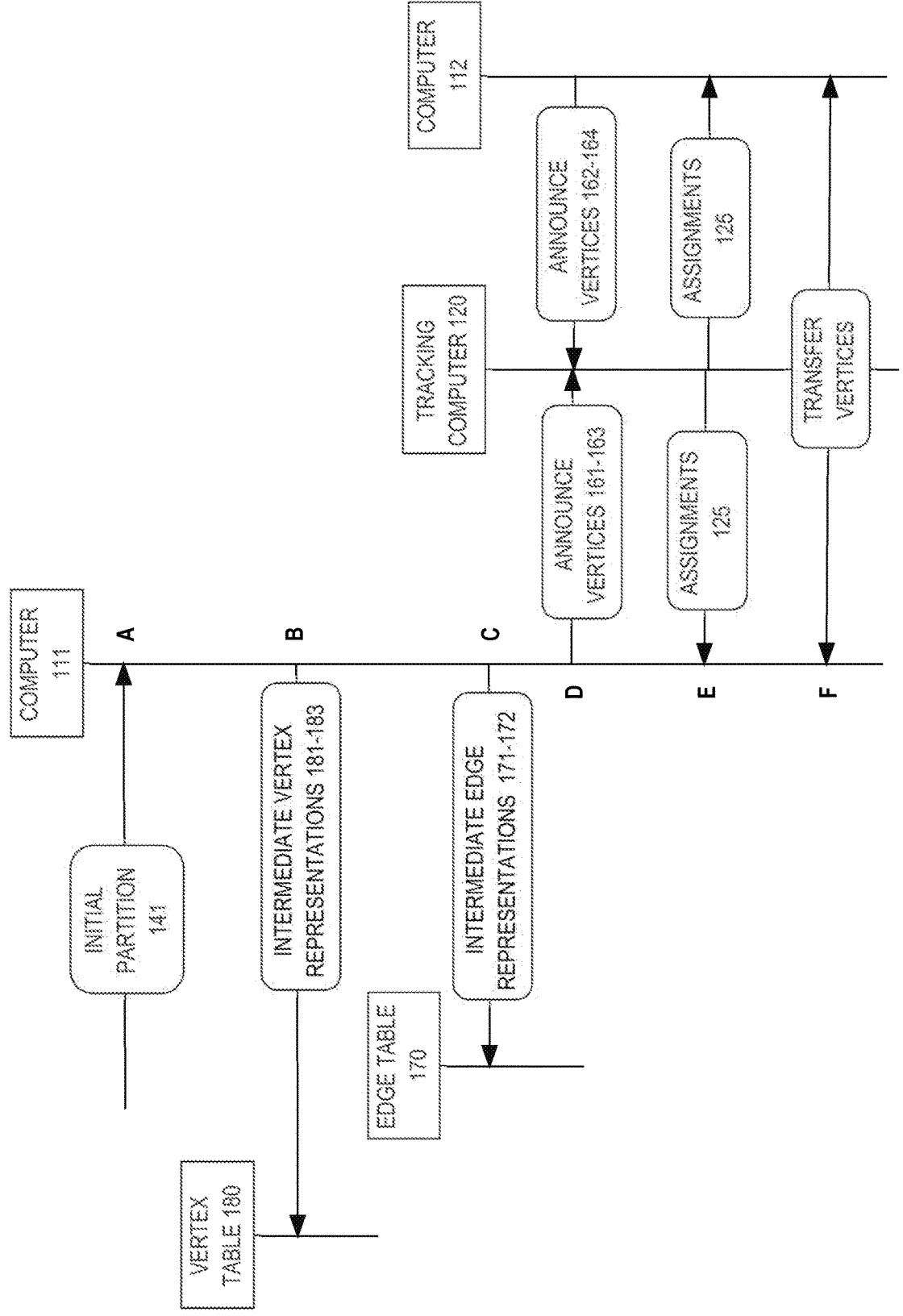
FIG. 2 is a scenario diagram that depicts an example process that uses minimal communication to repartition a distributed graph to achieve a balanced workload, in an embodiment.

FIG. 2 is a scenario diagram that depicts example distributed system 100 in operation. Thus, FIG. 2 is discussed with reference to FIG. 1.

FIG. 2 shows interactions as horizontal arrows between components. For example at time A, computer 111 receives initial partition 141. Although not shown, computer 112 receives initial partition 142 more or less at time A also.

For example, computers 111-112 may each respectively load a contiguously stored portion of graph 130, such as an equal amount of rows from a database table or lines of text from a file. Alternatively, graph 130 may be loaded partially or totally from a stream or multiple streams of data, such as time series data, such as a stock exchange ticker tape or concurrent ticker tapes from rival exchanges. No matter what data store(s) provides the details of graph 130, distributed system 100 needs only one pass over the data of graph 130 to achieve a distributed loading of graph 130.

At times B-C, which may be a same time, computers 111-112 store encode their initial partitions into mutable local data structures. For example, computer 111 encodes each vertex or edge of initial partition 141 as an intermediate representation row in table 170 or 180. Thus immediately after time C, graph 130 is loaded, although likely unbalanced.

At time D, computers 111-112 detect which computers track which vertices. Also at time D, computers 111-112 inform those tracking computers that various vertices are loaded along with a count of edges that those vertices originate.

At time E and based on the loading information provided by computers 111-112, tracking computers such as 120 decide which vertices should be reassigned to which other computers. Tracking computer 120 reassigns vertices to eliminate situations where multiple machines store different edges for a same vertex.

Thus at time E, tracking computer 120 updates assignments, such as 125, and then provides the updated assignments to computers that gain or lose ownership of involved vertices. Edge counts may be involved to decide reassignments, and edges are themselves reassigned when a vertex is reassigned.

As explained later herein and although not shown, the interaction at time D may be iteratively repeated. Subsequent announcements at time D may be limited to conflicted vertices (those with edges loaded by different computers).

Thus, information sent at time E may include identification of vertices that remain conflicted. As the process iteratively converges, the amounts of vertices involved at times D-E diminish. The amounts of vertices involved at times D-E may also be limited by batching, such that not all conflicted vertices are addressed in a same iteration, as explained later herein.

As explained above, initial partitioning may have unequal amounts of edges or vertices. Likewise, deconfliction by tracking computers may introduce or aggravate such an imbalance.

Thus at time F, rebalancing occurs. As explained later herein and although time F shows only a single interaction, rebalancing may actually be iterative and involve supervision by a master computer (not shown). However like reassignment, rebalancing merely entails annotating intermediate representations of vertices and/or edges as moved and updating assignments by tracking computers rather than actually moving the properties of vertices and edges.

As a more or less final activity at time F, after all reassignment and rebalancing is done, vertices and edges (including their identifiers and properties) are actually sent to the computers designated to finally host them. For example, a vertex may be virtually moved during deconfliction and/or virtually moved during rebalancing, perhaps repeatedly to various computers.

However, ultimately a tracking computer recorded some computer as finally owning a given vertex. Time F more or less finishes with computers forwarding vertices and edges (including their identifiers and properties) to other computers as indicated by the tracking computers.

Thus while times D-F may virtually shuffle vertices around as an accounting effort, time F finishes by actually moving the vertices to computers to achieve an actually balanced distribution. Such actual movement of vertices and edges may be done in bulk. Also at time F after the actual movement, computers 111-112 populate their materialized representations, such as 150, to reflect the final partitioning in a format that is optimized for reading during actual graph analysis. For example, a compressed sparse row format or a compressed sparse column format may be used as the materialized format, such as described in U.S. Pat. No. 8,775,495, entitled "Compression system and method for accelerating sparse matrix computations." A more detailed discussion of activity during time F is provided later herein.

4.0 Intermediate Representation

Figure 3:
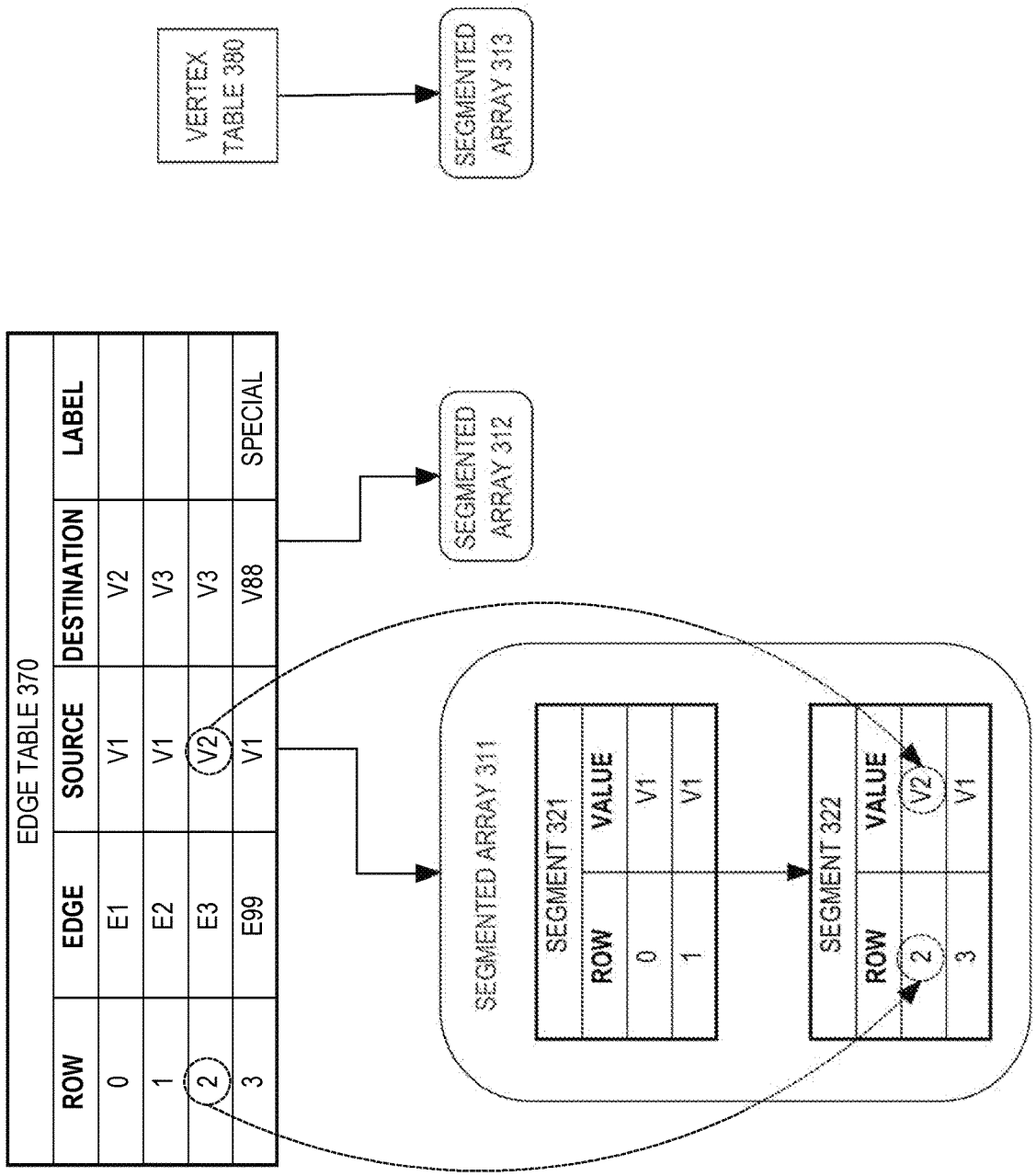
FIG. 3 is a block diagram that depicts an example computer that uses a segmented array to implement each column of an edge table or vertex table, in an embodiment.

FIG. 3 is a block diagram that depicts an example computer 300, in an embodiment. Computer 300 uses a segmented array to implement each column of an edge table or vertex table.

Computer 300 may be an implementation of computer 111. Computer 300 stores tables 370 and 380 in volatile memory.

4.1 Segmented Array

A segmented array is used for each column of tables 370 and 380 to optimize the performance of mutation. Thus, segmented arrays 311-313 are designed to efficiently append additional rows.

Thus after rebalancing, edges and rows that are actually moved to computer 300 from another computer may be rapidly inserted into tables 370 and 380. To facilitate rapid growth, segmented arrays 311-313 have a hybrid data structure that combines aspects of conventional arrays and linked lists.

A conventional array, such as a vector in the C++ standard template library, is prone to unpredictable latency during growth because growth entails copying all existing data in addition to allocating logarithmically more blank rows than actually needed. Thus, a conventional array has unstable growth performance.

Whereas, a linked list grows in constant time. However, a linked list may fragment a heap and thrash a CPU cache.

By using arrays as nodes (segments) of a linked list, a segmented array incrementally grows in constant time. A segment may be sized for a cache line. When segments share a fixed size and are indexed (not shown), random access of a row in a table column occurs in constant time when the column is implemented as a segmented array.

Edge table 370 topologically encodes edges as rows in a table that has source and destination columns to identify pairs of vertices that directed edges connect. For example, edge E3 originates at vertex V2 and terminates at vertex V3.

The row and edge columns of edge table 370 are for demonstrative purposes and are implied. Thus, the row and edge columns may be absent from some embodiments.

The row column of segments 321-322 also is demonstrative and implied. In embodiments, segments 321-322 are merely sequences of values stored contiguously, shown as a value column.

Vertices and edges may have many properties, with each property having its own table column implemented with its own segmented array. Actual movement of an edge requires appending a row into edge table 370, because various vertices and edges need materialization by actually transferring their properties. That transfer may include properties not previously encountered by a given computer.

For example, computer 300 may load an initial partition that contains edges E1-E3. As shown, edges E1-E3 have no custom properties.

Whereas, edge E99 and its label property may finally move to computer 300. Even though edge table 370 might not already have a label column, a label column and its segmented array may be created and added to edge table 370 just in time. Thus, tables 370 and 380 may lazily add (or remove) columns when needed.

For example, a column may be dynamically added to annotate a table with ownership information or dynamically removed to discard metadata (such as ownership information) no longer needed. However, actual identifier and property data are loaded and transferred together.

5.0 Segments

Figure 4:
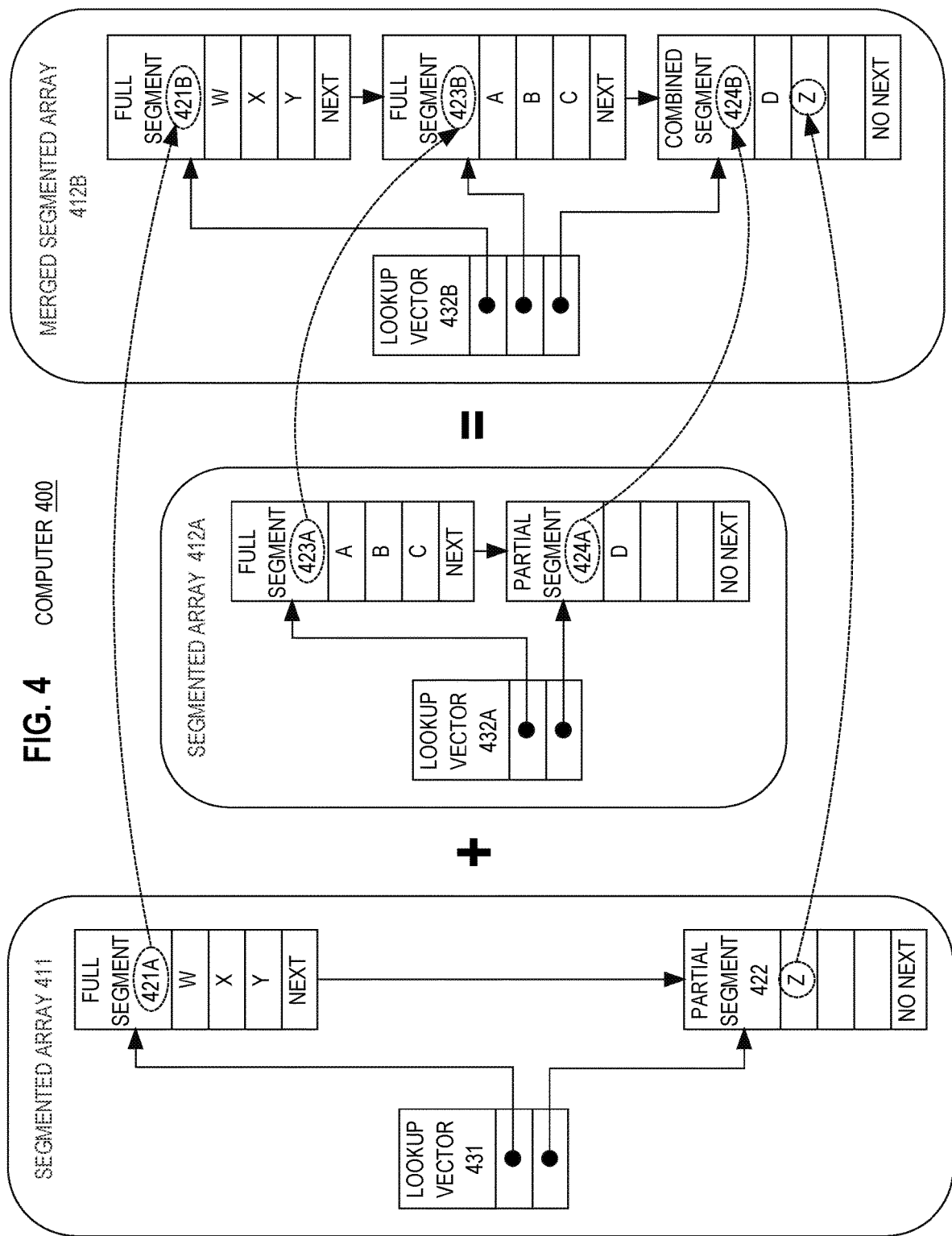
FIG. 4 is a block diagram that depicts an example computer that optimally merges two segmented arrays, in an embodiment.

FIG. 4 is a block diagram that depicts an example computer 400, in an embodiment. Computer 400 optimally merges two segmented arrays.

Computer 400 may be an implementation of computer 111. Segmented arrays 411-412 are stored in the memory of computer 400.

5.1 Random Access

The segments of each segmented array 411-412 are indexed by a lookup vector of pointers. For example, segmented array 411 has two segments, 421A and 422. Thus, lookup vector 431 has two pointers that point to respective segments 421A and 422.

Thus, random access of a particular segment occurs in constant time. When segments 421A and 422 have a same capacity (as shown), random access of any value in segmented array 411 occurs in constant time.

In the shown embodiment, each segment has a next pointer to a next segment. Thus, segment 421A has a next pointer to segment 422. Segment 422 may have a null value for its next pointer because segment 422 is the last segment of segmented array 411. In embodiments not shown, segments 421-422 do not have next pointers, and identification of a next segment entails dereferencing another pointer in a lookup vector such as 431. For example, the next pointer from full segments 421A to partial segment 422 may be absent and instead approximated by the pointer to partial segment 422 in lookup vector 431. Thus, computer 400 may instead iterate the segments of segmented array 411 by dereferencing successive contiguous pointers that occur in lookup vector 431 as shown.

5.2 Optimal Merge

Segmented arrays 411-412 may store values of a same table column (not shown). For example, actual movement of multiple vertices and/or edges may entail transmission of reassigned rows of a vertex table or edge table from one computer to another. Upon receipt of actually moved vertices or edges, the receiving computer may briefly store the received rows in temporary segmented arrays. To fulfil the actual movement of vertices or edges, the temporary segmented arrays may need to be merged into the vertex table and edge table of the receiving computer. For example, segmented array 411 may be temporary and for a same vertex column or edge column as segmented array 412. Thus eventually, computer 400 may need to merge segmented array 411 into segmented array 412A, which is shown as segmented array 412A becoming segmented array 412B. Such a merge mutates segmented array 412 and consumes (destroys) segmented array 411.

Computer 400 is optimized to minimize data copying when merging segmented arrays. Thus, computer 400 merges segmented arrays in optimal time.

Computer 400 accomplishes an optimal merge primarily by adjusting segment pointers and secondarily by copying at most one partial segment such as 422. A partial segment is not fully populated. As shown, segmented arrays 411 and 412A may each have one partial segment as a last segment.

Thus, segmented array 411 contains at most one partial segment (422) and at least one full segment (421A). During a merge, computer 400 reassigns the next pointer of the last full segment (421A) of segmented array 411 to point to the first segment of segmented array 412A.

Thus, the first segment of segmented array 412B is shown as segment 421B, which actually was segment 421A. Thus, computer 400 prepends all of the full segments of segmented array 411 onto the beginning of segmented array 412A.

Computer 400 accomplishes that by reassigning one next pointer and without copying any column values. Computer 400 also prepends pointers to those inserted segments (e.g. 421B) onto the beginning of lookup vector 432B. Such prepending occurs in time that is linear with the total number of segments of segmented arrays 411 and 412A, which may be orders of magnitude less than the number of rows in the edge table.

Computer 400 also appends the contents of partial segment 422 into partial segment 424A, shown as combined segment 424B that was partial segment 424A. Such appending occurs in time that is linear with the fixed size that all segments have, which may be orders of magnitude less than the number of rows in the edge table. If necessary (not shown), computer 400 may reuse partial segment 422 by adjusting the next pointer (and lookup vector 432B) to point to partial segment 422, such as when the merge causes combined segment 424B to overflow. Thus as described, computer 400 may merge two segmented arrays in time that is less (better) than linear with the number of rows in the edge table.

6.0 Table Optimizations

Figure 5:
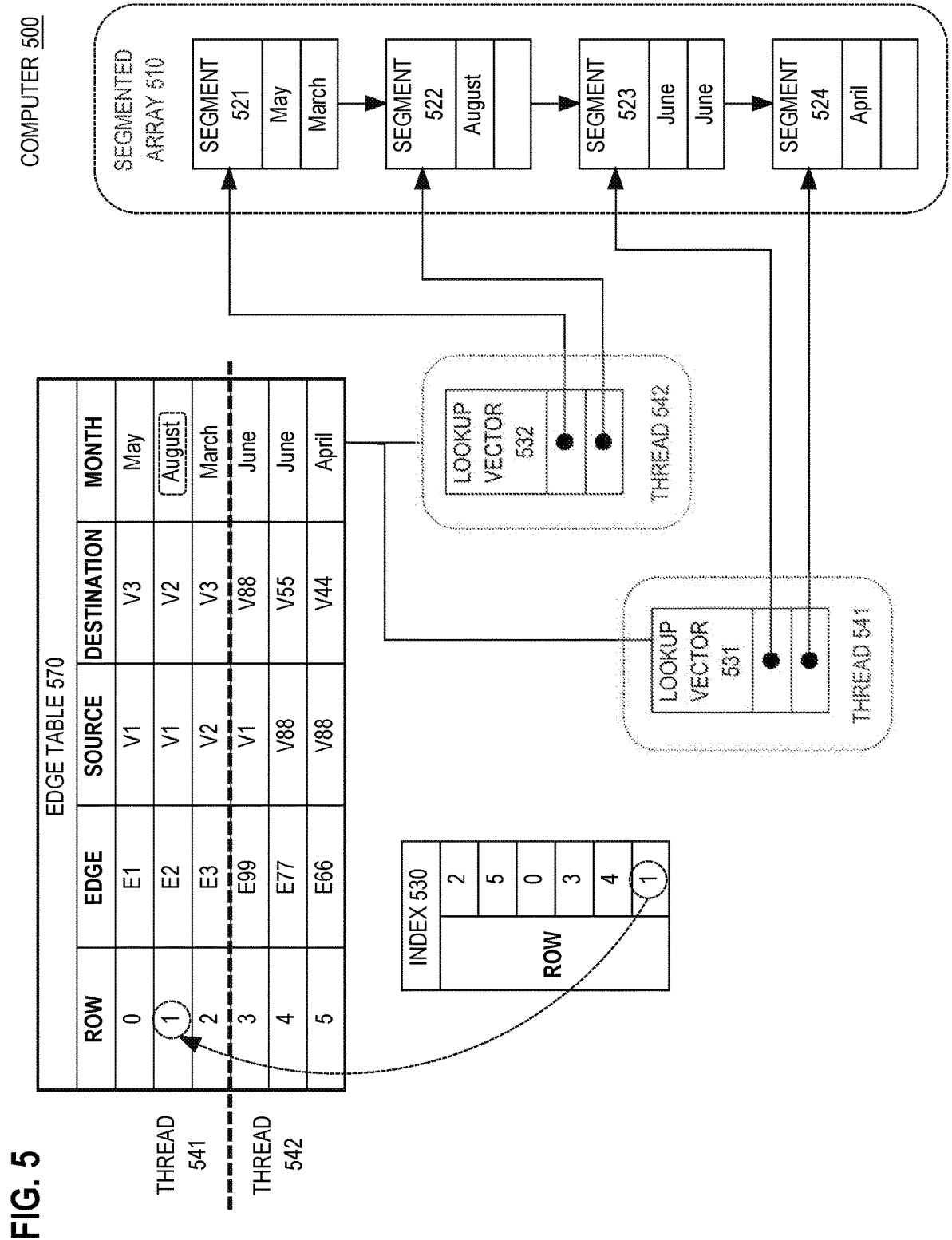
FIG. 5 is a block diagram that depicts an example computer that has various optimizations that accelerate the use of a vertex table or edge table, in an embodiment.

FIG. 5 is a block diagram that depicts an example computer 500, in an embodiment. Computer 500 has various optimizations that accelerate the use of a vertex table or edge table. Computer 500 may be an implementation of computer 111.

6.1 Indexing

The rows of edge table 570 may occur in a same ordering as initially loaded, which as explained above, may vary according to implementation details such as source file format. Thus, the rows of edge table 570 may be arbitrarily ordered in a way that does not reveal an ordering that is natural to the edge property data.

For example, the values in the month column of edge table 570 are not in calendar order. For example, August does not naturally occur between March and May, even though edge table 570 shows such an unnatural ordering of months.

Index 530 may provide fast access to the months (and the edges themselves) of edge table 570 in a sorted ordering, such as a natural order, such as according to a calendar. The row numbers that are stored in index 530 are sorted by month according to the calendar. Thus, row 1 is listed last in index 530, because in row 1 of edge table 570 is August, which is the naturally last of the values in the month column when calendar sorted.

Indexing may serve two purposes, one of which is sorting as explained above. The other purpose is aggregation.

For example, enumeration of neighbor vertices of a current vertex may involve selecting all edges that originate at the current vertex. Thus, the source column of edge table 570 may have its own index that merely groups edges by source vertex without actual numeric sorting.

6.2 Multithreading

Computer 500 has execution threads 541-542 that may run concurrently when allocated to separate CPUs or cores, such as with symmetric multiprocessing (SMP).

All of the edges owned (initially loaded or transferred from other computers) by computer 500 are stored as rows in edge table 570. Edge table 570 provides a separate table view of edge table 570 to each of threads 541-542.

Table views share a segmented array for each column, such as segmented array 510 for the month column. Edge table 570 is inherently thread safe for concurrent reading.

In embodiments, some operations (e.g. row deletion) are not inherently thread safe, and synchronization may be needed to achieve thread safety.

6.3 Table View

The horizontal bold dashed line shows that table view for thread 541 exposes the rows of the top half of edge table 570. Likewise, the table view for thread 542 exposes the rows of the bottom half of edge table 570.

However, such as neat split is not essential. For example, an embodiment may instead expose every odd row through the table view of thread 541 and expose every even row through the table view of thread 542. Indeed, insertion of an additional row may occur by appending to the bottom of edge table 570 regardless of which thread should view the additional row.

As described, a table view may project a subset of rows of an underlying table. Likewise by including a subset of segmented arrays of the underlying table, a table view may project a subset of columns.

Growth (addition of rows) of edge table 570 may be inherently thread safe so long as each table view exposes a non-overlapping and sufficiently pre-allocated portion (e.g. whole segments) of segmented array 510. For example, segments 521-522 are allocated for thread 542, and segments 523-524 are for thread 541. Segment 522 has spare capacity for an additional value to be inserted later into thread 542's table view.

The table view of each thread has its own lookup vector that contains pointers to indicate which segments belong to which thread. For example, lookup vector 532 has pointers that indicate that segments 521-522 belong to thread 542.

Non-overlapping, as mentioned above, means that no row of edge table 570 is shared by multiple table views. However, rows owned by different table views may be interleaved (not shown) within edge table 570.

As shown, each of lookup vectors 531-532 has pointers to adjacent segments. For example, all of thread 542's segments 521-522 occur in segmented array 510 before all of thread 541's segments 523-524. However, the segments of threads 541-542 may be interleaved (not shown), such that a segment for thread 541 occurs between two segments for thread 542.

7.0 Logical Topology

Figure 6:
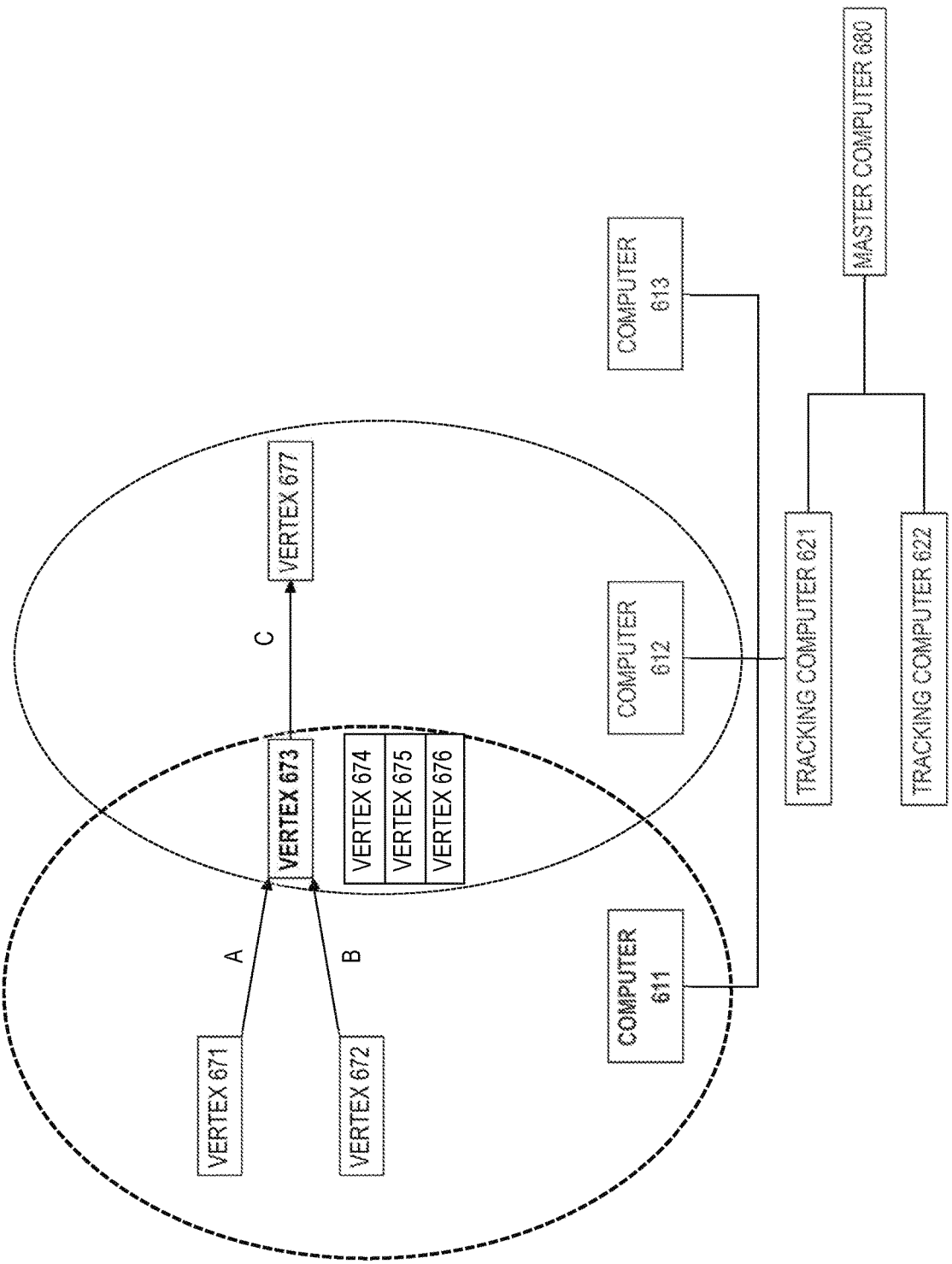
FIG. 6 is a block diagram that depicts an example computer cluster arranged in a logical topology that is dynamically managed by tracking computers, in an embodiment.
Figure 7:
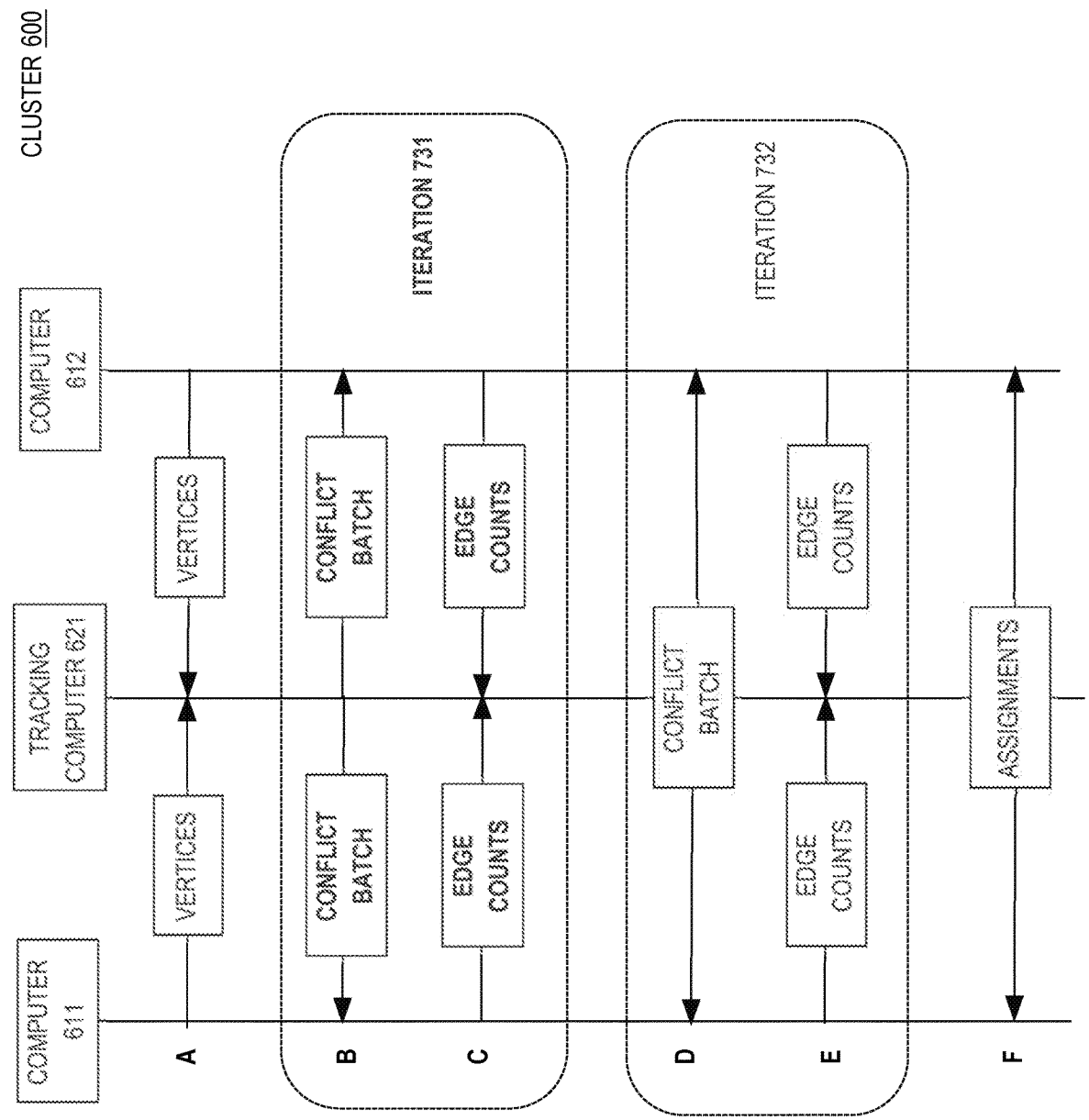
FIG. 7 is a scenario diagram that depicts example process that uses batching and iteration for deconfliction of redundantly loaded vertices, in an embodiment.
Figure 8:
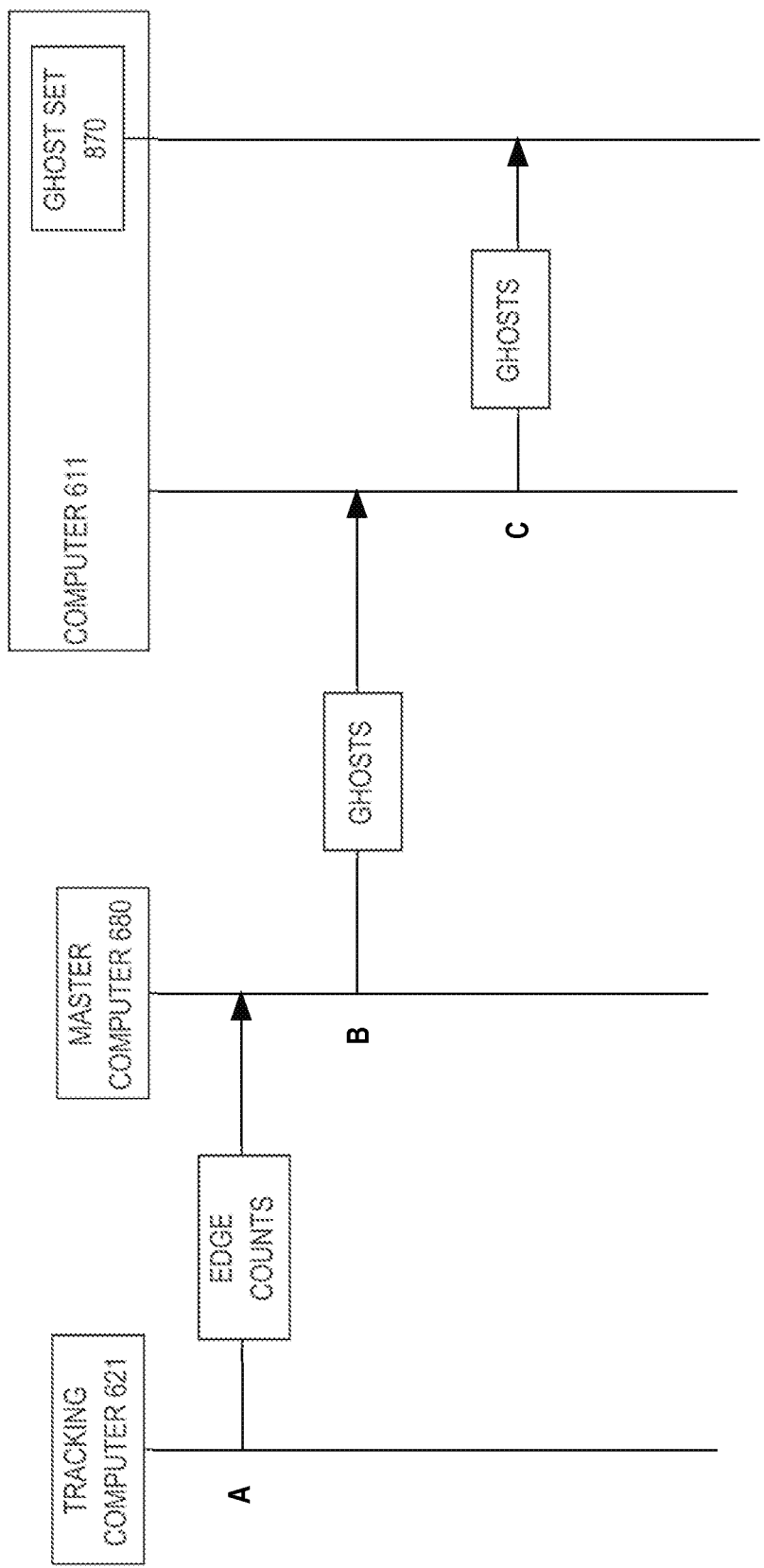
FIG. 8 is a scenario that depicts an example process that uses ghost vertices to avoid conflicts, in an embodiment.
Figure 9:
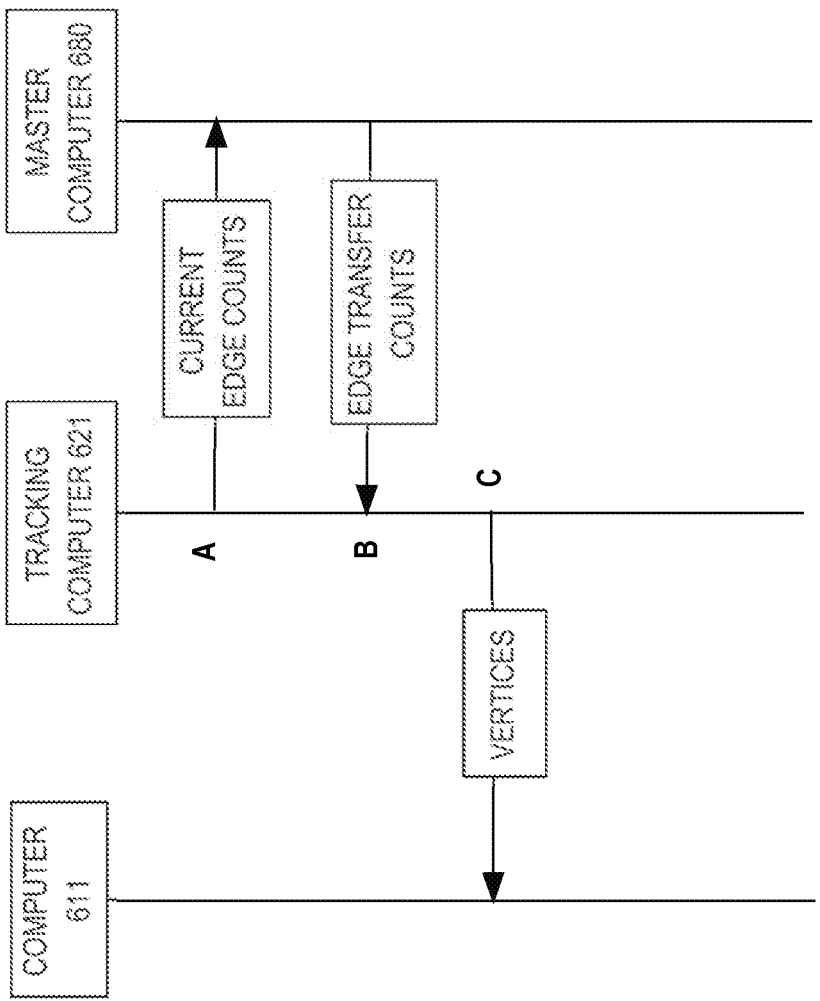
FIG. 9 is a scenario that depicts an example process that uses the master computer to rebalance partitions, in an embodiment.

The techniques described above may be combined in various ways to load and adjust graph partitions. FIG. 6 shows a computer cluster arranged in a logical topology that is dynamically managed by tracking computers. FIG. 6 introduces a top tier consisting of a sole master computer that imposes central control to direct the tracking computers. FIGS. 7-9 shows additional techniques, more or less based on that cluster, for further coordination.

FIG. 6 is a block diagram that depicts an example cluster 600, in an embodiment. Cluster 600 has a central master computer to manage tracking computers.

Cluster 600 may be an implementation of distributed system 100. Cluster 600 contains computers 611-613, 621-622, and 680.

Computers 611-613 each load a partition of a graph. Some vertices of the graph, such as 673-676, may be redundantly loaded by two or more of computers 611-613.

For example, computer 611 may load vertex 673 as part of loading edges A-B. Likewise, computer 612 may also (redundantly) load vertex 673 as part of loading edge C. Redundant loading may need deconfliction as detected, decided, and directed by tracking computers 621-622.

Tracking computers 621-622 track which computers own which vertices and how many edges and may direct computers 611-613 to redistribute vertices and edges in various ways. Tracking computers 621-622 may centrally coordinate through master computer 680.

Computers 621-622 and 680 may each also load a respective partition. Master computer 680 may also be a tracking computer. Cluster 600 has only one master computer.

Additional coordination techniques that use cluster 600, with or without master computer 680, are presented with FIGS. 7-9 and discussed as follows.

8.0 Deconfliction

FIG. 7 is a scenario diagram that depicts an example technique for operating cluster 600, in an embodiment. This technique uses batching and iteration for deconfliction of redundantly loaded vertices.

This technique includes a preparatory phase and subsequent iterations, such as 731-732. The preparatory phase occurs at time A.

At time A computers 611-613 each loads a respective partition of a graph. Also at time A, computers 611-613 hash an identifier of each vertex they load to detect which of their vertices are tracked by which of tracking computers 621-622.

For example, cluster 600 may identify each of tracking computers 621-622 by a zero-based serial number and each of the vertices of the entire graph by a zero-based ordinal (offset) into a global list of vertices. A hash function may take a vertex ordinal as an argument and emit a tracking computer serial number.

For example, the hash function may divide the vertex ordinal by a count of tracking computers of cluster 600 and return the remainder (modulo) as a tracking computer serial number. Thus, cluster 600 may identify a tracking computer for each vertex of the graph, and each tracking computer tracks a same amount of vertices.

Thus, computers 611-613 may each load vertices and detect which of tracking computers 621-622 tracks each loaded vertex. Thus, computers 611-613 may detect which of their vertices are tracked by tracking computer 621.

Also at time A, computers 611-613 announce to tracking computers 621-622 which vertices are loaded. At time B and based on the announcements of loaded vertices, tracking computers 621-622 may detect vertex conflicts.

For example, tracking computer 621 may detect that vertices 673-676 are redundantly loaded by computers 611-613. However, only redundant vertices that originate edges from different computers are conflicted. In embodiments at time A, computers 611-613 announce to tracking computers 621-622 which vertices are redundantly loaded and/or which vertices are conflicted.

For example, vertex 677 is not conflicted even if computer 611 loaded edge C because vertex 677 does not originate any edges that terminate at a redundantly loaded vertex. For example even if computer 612 loaded vertex 677, another vertex (not shown), and an edge that connects those two vertices and originates at vertex 677, then vertex 677 would still not be conflicted because the edge and its endpoints are local Also at time B in embodiments (not shown), tracking computers 621-622 may announce all of the vertices of the graph that are conflicted to computers 611-613. However, an attempt to exhaustively deconflict in a single pass may need an amount of memory on the order of the multiplicative product of the number of vertices of the graph times the number of computers 611-613 in cluster 600.

In the shown embodiment, tracking computers 621-622 instead announce conflicted vertices in batches having a same fixed amount of vertex identifiers. In the shown embodiment, tracking computer prepares a first batch of vertex identifiers from computer 611 that are conflicted, a second batch of vertex identifiers from computer 612 that are conflicted, and a third batch (not shown) of vertex identifiers from computer 613 that are conflicted.

Thus in the shown embodiment, the three batches identify disjoint (non-overlapping) or partially overlapping sets of vertices. At time B, tracking computer 621 sends each of those batches to a respective computer of 611-613. In embodiments (not shown), tracking computer 621 prepares only one batch instead of three and broadcasts it to all computers 611-613.

At time C, each of computers 611-613 respond to a received conflict batch by reporting to tracking computer 621 how many edges are currently owned by the computer. For example, computer 611 may report for each conflicted vertex of the batch a count of that vertex's inbound edges currently owned by computer 611 and a count of that vertex's outbound edges currently owned.

After iteration 731, the process generally repeats the process during iteration 732. Iteration continues until no vertices are conflicted.

At time F, tracking computers 621-622 process the received edge counts and reassigns the respective conflicted vertices to one of computers 611-613 based on which computer already owns the most edges that are connected to a respective conflicted vertex. For example, tracking computer 621 may designate computer 611 as sole owner of vertex 673, because computer 611 has more edges (A-B) for vertex 673 than does computer 612.

If a vertex originates no edges, tracking computer 621 reassigns the vertex to whichever computer initially loaded the properties of the vertex. Edges of vertices that are not conflicted are reassigned to whichever computer owns the vertex that originates the edge.

Also at time F, tracking computer 621 moves any vertices and edges that it reassigns by sending reassignments to computers 611-613.

9.0 Ghost Vertex

FIG. 8 is a scenario diagram that depicts an example technique for operating cluster 600, in an embodiment. This technique uses ghost vertices to avoid conflicts.

This technique is performed before first iteration 731 of deconfliction. Indeed, times A-C of FIG. 8 occur during time A of FIG. 7.

The more edges a vertex has, the more likely the vertex is to be redundantly loaded (and thus potentially conflicted). Furthermore even after deconfliction, a vertex of high degree (edge count) may still have many edges that originate or terminate at vertices owned by other computers.

Thus, vertices of high degree may cause excessive communication during subsequent graph analytics, even after repartitioning is done. A ghost vertex is a lightweight proxy that represents a same vertex on all computers, although only one computer actually loads the properties of the ghost vertex.

Thus, subsequent analysis of a ghost vertex and a subset of its edges may occur entirely local to any of the various computers and without network communication. Thus, a ghost vertex is not subjected to deconfliction.

At time A, tracking computers 621-622 detect which of their tracked vertices have a degree that exceeds a threshold. Those are the high degree vertices.

Also at time A, tracking computers 621-622 rank (sort) the high degree vertices by degree and select at most a first fixed amount of those vertices having the highest degrees. Those are the ghost candidate vertices. Also at time A, tracking computers 621-622 report an identifier and edge count for each candidate vertex to master computer 680.

At time B, master computer 680 ranks the candidate vertices by their degree and promotes at most a second fixed amount of them to actually be ghost vertices. Also at time B, master computer 680 announces the identifiers of the ghost vertices to computers 611-613.

Each of computers 611-613 has a separate data structure, such as ghost set 870, to record which vertices are ghosts. Ghost set 870 is separate and in addition to the vertex table of each computer. At time C, each of computers 611-613 insert all of the ghost vertices into its own ghost set.

After all phases and iterations (e.g. FIG. 7) of virtual movement of vertices and edges are done, cluster 600 actually repartitions by actually moving vertices and edges (including their identifiers and properties) to their decided owner computers. During such actual movement, a computer that initially loaded properties of a moving vertex or edge actually sends those properties to another computer.

During such actual movement, edges outgoing/incoming from/to a ghost vertex are moved to whichever computer owns the non-ghost end of an edge. Edges between two ghost vertices are not moved.

10.0 Rebalancing

FIG. 9 is a scenario diagram that depicts an example technique for operating cluster 600, in an embodiment. This technique uses the master computer to rebalance partitions.

This technique is iteratively performed, although FIG. 9 shows only one iteration. In embodiments, one or more iterations of this technique occur after each of deconfliction iterations 731-732 of FIG. 7. In embodiments, this technique performs its iterations only after all deconfliction iterations have finished.

At time A, tracking computers 621-622 each report to master computer 680 how many edges originate and how many edges terminate at a computer for vertices that are tracked by the tracking computer.

At time B based on those counts, master computer 680 detects which computers have too many edges and thus are imbalanced. Master computer 680 may invoke various rules, heuristics, and logic to decide how many edges should some computers virtually move and to which other computers.

Also at time B based on that deciding, master computer directs each tracking computer to transfer a respective first count of edges from a first computer to a second computer, and a second count of edges to transfer from a third computer to a fourth computer, and so forth. At time C and based on the respective transfer counts, each of tracking computers 621-622 may invoke various rules, heuristics, and logic to decide which surplus vertices should be virtually moved to approximately achieve the edge transfer counts.

Further processing at time C depends on the embodiment. In embodiments that perform this technique only after finishing all deconfliction iterations, processing at time C occurs in between the processing of times D-E of FIG. 2.

In embodiments, processing at time C may be included in processing at time D of FIG. 7. Regardless of embodiment at time C, master computer 680 directs tracking computers 621-622 to virtually move which surplus vertices (and their edges) to which other computers.

11.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
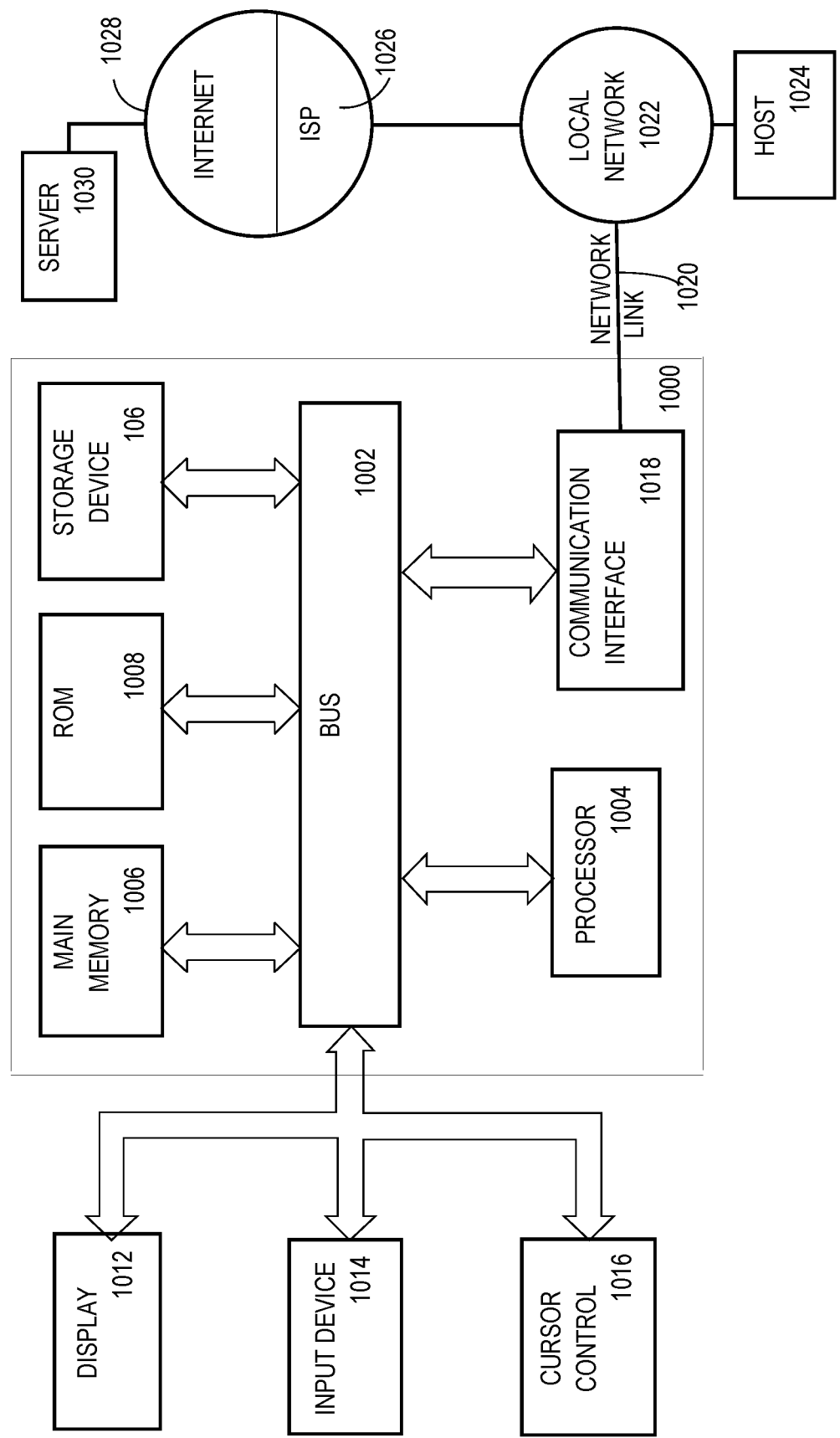
FIG. 10 is a block diagram that illustrates a computer system upon which an embodiment of the invention may be implemented.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 106, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 106. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 106. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 106 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 106, or other non-volatile storage for later execution.

12.0 Software Overview

Figure 11:
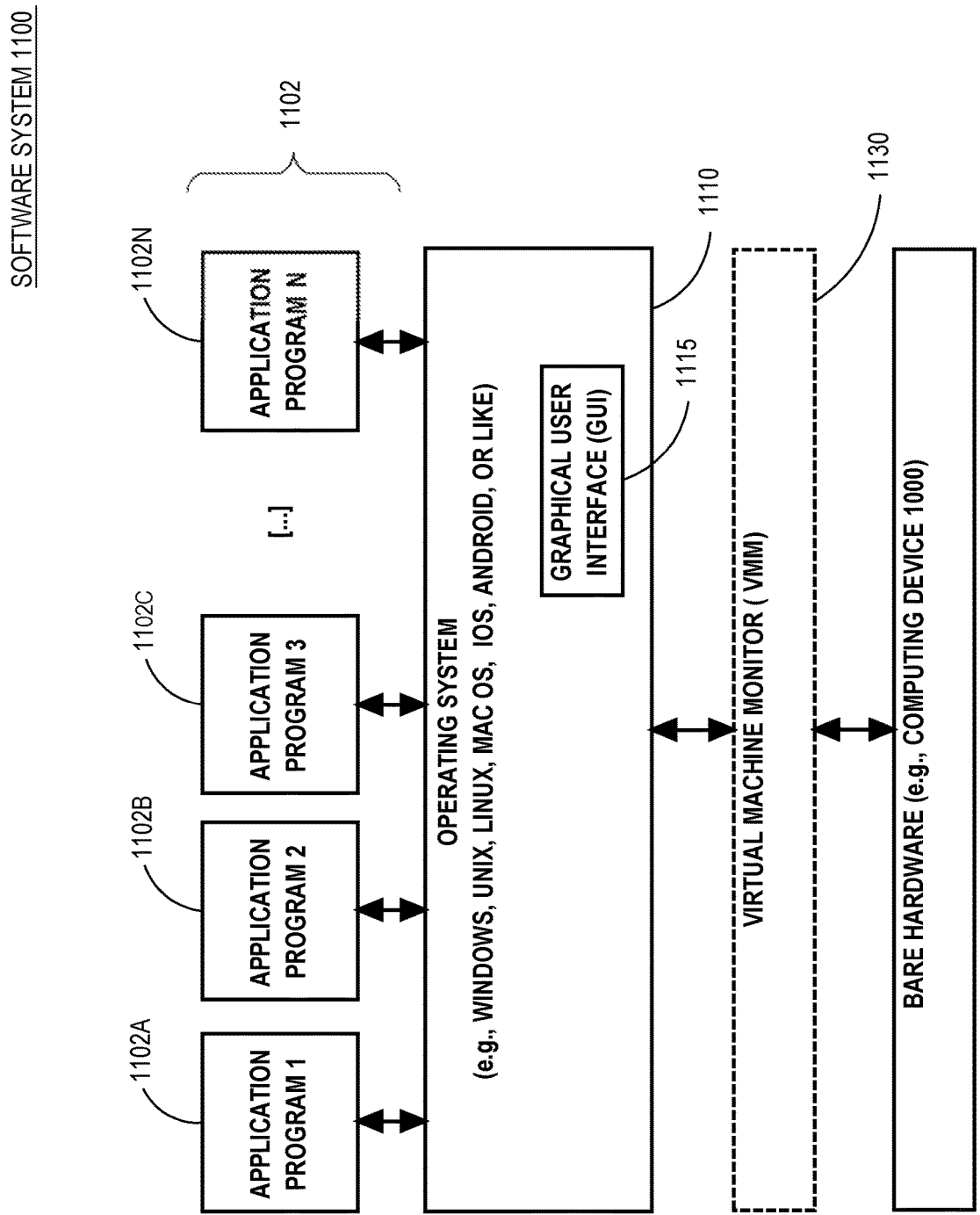
FIG. 11 is a block diagram that illustrates a basic software system 500 that may be employed for controlling the operation of a computing system.

FIG. 11 is a block diagram of a basic software system 1100 that may be employed for controlling the operation of computing system 1000. Software system 1100 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1100 is provided for directing the operation of computing system 1000. Software system 1100, which may be stored in system memory (RAM) 1006 and on fixed storage (e.g., hard disk or flash memory) 106, includes a kernel or operating system (OS) 1110.

The OS 1110 manages low-level aspects of computer operation, including managing execution of processes, memory allocation, file input and output (I/O), and device I/O. One or more application programs, represented as 1102A, 1102B, 1102C . . . 1102N, may be "loaded" (e.g., transferred from fixed storage 106 into memory 1006) for execution by the system 1100. The applications or other software intended for use on computer system 1000 may also be stored as a set of downloadable computer-executable instructions, for example, for downloading and installation from an Internet location (e.g., a Web server, an app store, or other online service).

Software system 1100 includes a graphical user interface (GUI) 1115, for receiving user commands and data in a graphical (e.g., "point-and-click" or "touch gesture") fashion. These inputs, in turn, may be acted upon by the system 1100 in accordance with instructions from operating system 1110 and/or application(s) 1102. The GUI 1115 also serves to display the results of operation from the OS 1110 and application(s) 1102, whereupon the user may supply additional inputs or terminate the session (e.g., log off).

OS 1110 can execute directly on the bare hardware 1120 (e.g., processor(s) 1004) of computer system 1000. Alternatively, a hypervisor or virtual machine monitor (VMM) 1130 may be interposed between the bare hardware 1120 and the OS 1110. In this configuration, VMM 1130 acts as a software "cushion" or virtualization layer between the OS 1110 and the bare hardware 1120 of the computer system 1000.

VMM 1130 instantiates and runs one or more virtual machine instances ("guest machines"). Each guest machine comprises a "guest" operating system, such as OS 1110, and one or more applications, such as application(s) 1102, designed to execute on the guest operating system. The VMM 1130 presents the guest operating systems with a virtual operating platform and manages the execution of the guest operating systems.

In some instances, the VMM 1130 may allow a guest operating system to run as if it is running on the bare hardware 1120 of computer system 1100 directly. In these instances, the same version of the guest operating system configured to execute on the bare hardware 1120 directly may also execute on VMM 1130 without modification or reconfiguration. In other words, VMM 1130 may provide full hardware and CPU virtualization to a guest operating system in some instances.

In other instances, a guest operating system may be specially designed or configured to execute on VMM 1130 for efficiency. In these instances, the guest operating system is "aware" that it executes on a virtual machine monitor. In other words, VMM 1130 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

13.0 Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
by each participating computer of a plurality of computers:
receiving a respective initial partition that contains a respective subset of edges of a plurality of edges of a graph and a respective subset of vertices of a plurality of edges of the graph;
for each edge of the respective subset of edges, storing an intermediate representation of the edge into an edge table that resides on the participating computer; and
for each vertex of the respective subset of vertices:
storing an intermediate representation of the vertex into a vertex table that resides on the participating computer, and
announcing that the vertex resides on the participating computer to a respective tracking computer of the plurality of computers;
making assignments of particular vertices of the graph to particular computers of the plurality of computers and making the assignments available to the plurality of computers;
transferring the particular vertices of the assignments and edges that originate at the particular vertices to the particular computers of the assignments;
by each participating computer of the plurality of computers, storing a materialized representation of a respective balanced partition.

2. The method of claim 1 wherein:
the edge table and the vertex table that reside on the participating computer are not optimized for reading;
the materialized representation of the respective balanced partition is optimized for reading.

3. The method of claim 1 wherein one or more segmented arrays are contained within at least one table selected from: the edge table and the vertex table.

4. The method of claim 3 wherein at least one segmented array of the one or more segmented arrays is associated with a particular column of one table selected from: the edge table and the vertex table.

5. The method of claim 1 further comprising:
populating at least one row of a particular table selected from: the edge table and the vertex table;
adding, after said populating, a new column to the particular table.

6. The method of claim 1 wherein the materialized representation of the respective balanced partition comprises at least one format selected from: compressed sparse row format and compressed sparse column format.

7. The method of claim 1 wherein:
the method further comprises creating a view of a particular table that provides access to a subset selected from at least one of: columns of the particular table and rows of the particular table;
the particular table comprises one table selected from: the edge table and the vertex table.

8. The method of claim 1 wherein:
a particular table comprises a particular column and an index for the particular column that contains row identifiers of rows of the particular table that are sorted by values of rows in the particular column;
the particular table is selected from: the edge table and the vertex table.

9. The method of claim 1 wherein:
receiving the respective initial partition that contains the respective subset of edges of the plurality of edges of the graph comprises each participating computer of the plurality of computers independently retrieving a respective subset of edges from a store that is shared by the plurality of computers;
properties of each edge of the plurality of edges of the graph is retrieved from the store by only one participating computer of the plurality of computers.

10. The method of claim 1 further comprising, for each vertex of the plurality of vertices that originates an edge of the respective subset of edges of a participating computer of the plurality of computers:
identifying, based on the vertex, the respective tracking computer of the plurality of computers; and
notifying the respective tracking computer that the vertex is loaded on the participating computer.

11. The method of claim 10 wherein notifying the respective tracking computer that the vertex is loaded on the participating computer comprises the participating computer sending to the respective tracking computer: a count of edges that the vertex originates, and a count of edges that the vertex terminates.

12. The method of claim 11 further comprising:
the respective tracking computer:
summing, into a total edge count for the vertex:
the counts of edges that the vertex originates that are received from the plurality of computers, and
the counts of edges that the vertex terminates that are received from the plurality of computers; and
reporting the total edge count for the vertex to a master computer if at least one selected from:
the total edge count exceeds a threshold, and
the vertex is among a fixed amount of vertices that has the highest total edge counts
the master computer:
summing, into a grand total edge count for the vertex, the total edge count for the vertex that are received from one or more tracking computers of the plurality of computers;
broadcasting, to the plurality of computers, identifiers of a fixed amount of vertices that have the highest grand total edge counts;
each participating computer of the plurality of computers marking the vertices identified by the identifiers as ghosts in the edge table of the participating computer.

13. The method of claim 10 wherein the participating computer sends, to the respective tracking computer, an indication of whether or not the vertex has an edge that connects a vertex stored on a different participating computer of the plurality of computers.

14. The method of claim 1 wherein:
storing the materialized representation of the respective balanced partition is based on:
the edge table that resides on the participating computer, the vertex table that resides on the participating computer, and the vertices and the edges that were transferred to the participating computer;
edges stored in the materialized representation of the respective balanced partition are stored in a different format than edges stored in the edge table that resides on the participating computer.

15. One or more computer-readable non-transitory media storing instructions that, when executed by one or more processors, cause:

by each participating computer of a plurality of computers:
  receiving a respective initial partition that contains a respective subset of edges of a plurality of edges of a graph and a respective subset of vertices of a plurality of edges of the graph;
  for each edge of the respective subset of edges, storing an intermediate representation of the edge into an edge table that resides on the participating computer; and
  for each vertex of the respective subset of vertices:
    storing an intermediate representation of the vertex into a vertex table that resides on the participating computer, and
    announcing that the vertex resides on the participating computer to a respective tracking computer of the plurality of computers;
by each tracking computer of the plurality of computers, making assignments of particular vertices of the graph to particular computers of the plurality of computers and making the assignments available to the plurality of computers;
by the plurality of computers, transferring the particular vertices of the assignments and edges that originate at the particular vertices to the particular computers of the assignments;
by each participating computer of the plurality of computers, storing a materialized representation of a respective balanced partition based on: the edge table that resides on the participating computer, the vertex table that resides on the participating computer, the vertices and the edges that were transferred to the participating computer, and the edges that were transferred to the participating computer, wherein edges stored in the materialized representation of the respective balanced partition are stored in a different format than edges stored in the edge table that resides on the participating computer.

16. The one or more computer-readable non-transitory media of claim 15 wherein:
  the edge table and the vertex table that reside on the participating computer are not optimized for reading;
  the materialized representation of the respective balanced partition is optimized for reading.

17. The one or more computer-readable non-transitory media of claim 15 wherein one or more segmented arrays are contained within at least one table selected from: the edge table and the vertex table.

18. The one or more computer-readable non-transitory media of claim 15 wherein the instructions further cause:
  populating at least one row of a particular table selected from: the edge table and the vertex table;
  adding, after said populating, a new column to the particular table.

19. The one or more computer-readable non-transitory media of claim 15 wherein the materialized representation of the respective balanced partition comprises at least one format selected from: compressed sparse row format and compressed sparse column format.

20. The one or more computer-readable non-transitory media of claim 15 wherein:
  the instructions further cause creating a view of a particular table that provides access to a subset selected from at least one of: columns of the particular table and rows of the particular table;
  the particular table comprises one table selected from: the edge table and the vertex table.

21. The one or more computer-readable non-transitory media of claim 15 wherein:
  a particular table comprises a particular column and an index for the particular column that contains row identifiers of rows of the particular table that are sorted by values of rows in the particular column;
  the particular table is selected from: the edge table and the vertex table.

22. The one or more computer-readable non-transitory media of claim 15 wherein:
  receiving the respective initial partition that contains the respective subset of edges of the plurality of edges of the graph comprises each participating computer of the plurality of computers independently retrieving a respective subset of edges from a store that is shared by the plurality of computers;
  properties of each edge of the plurality of edges of the graph is retrieved from the store by only one participating computer of the plurality of computers.

23. The one or more computer-readable non-transitory media of claim 15 wherein the instructions further cause, for each vertex of the plurality of vertices that originates an edge of the respective subset of edges of a participating computer of the plurality of computers:
  identifying, based on the vertex, the respective tracking computer of the plurality of computers; and
  notifying the respective tracking computer that the vertex is loaded on the participating computer.

24. The one or more computer-readable non-transitory media of claim 15 wherein:
  storing the materialized representation of the respective balanced partition is based on:
    the edge table that resides on the participating computer, the vertex table that resides on the participating computer, and the vertices and the edges that were transferred to the participating computer;
  edges stored in the materialized representation of the respective balanced partition are stored in a different format than edges stored in the edge table that resides on the participating computer.

* * * * *